Nov. 21, 1939.　　　R. J. SCOTT　　　2,181,074
HEAT INSULATING PANEL
Filed May 27, 1939　　　2 Sheets-Sheet 1

INVENTOR
Roy J. Scott
BY
ATTORNEY

Nov. 21, 1939.      R. J. SCOTT      2,181,074
HEAT INSULATING PANEL
Filed May 27, 1939      2 Sheets-Sheet 2

INVENTOR
Roy J. Scott
BY
Alan N. Mann
his ATTORNEY

Patented Nov. 21, 1939

2,181,074

UNITED STATES PATENT OFFICE 2,181,074

HEAT INSULATING PANEL

Roy J. Scott, Forest Hills, N. Y., assignor to Alfol Insulation Company, Inc., a corporation of Delaware Application May 27, 1939, Serial No. 276,084

15 Claims. (Cl. 189—34)

My invention relates to heat insulating devices and more particularly to a pre-fabricated panel-type of metal assembly that may be used on various industrial equipment such as for example oil tanks to preserve heat.

Heretofore, metal panels, which have been proposed for insulating certain high temperature equipment such as dryers and boilers, have been subject to substantial heat losses from one face of the panel to the other. This is caused primarily by solid metal connections of substantial surface contact area between the two faces of the panel which conduct heat directly through the panel and thereby destroy a large part of the desired heat insulating property of the panel. In some embodiments both opposite faces of these panels are made of solid sheet metal and the sheets joined together at the sides by relatively large solid metal flanges bent into flat surface contact with each other. In other cases one face is made of sheet metal and the opposite face of chicken wire reinforced with solid metal bands of substantial size and joined to the opposite sheet metal face by large through bolts which provide direct, through-metal contact between panel faces.

In accordance with my invention the above described disadvantages and limitations characteristic of the insulating devices used heretofore have been overcome by constructing one face of the panel from reticulated metal having substantially the strength of "expanded metal" and joining the same only at spaced points and with small surface area contacts to a sheet metal cover plate which forms the opposite face of the panel; the point-like connections minimizing through-metal contact and reducing heat losses to substantially a negligible amount. This heat insulating device may be prefabricated and may be made in units of any desired size and shape whereby installation of these units around or upon the equipment to be insulated can be easily effected.

The expanded-metal or similar reticulated metal may be of the usual commercial form which has substantial strength and rigidity and is therefore self-supporting. When used for edge walls the reticulated metal should have sufficient strength to act as a separating means between the sheet metal cover plate and the insulated structure. However, the reticulated metal has appreciable open spaces that provide some flexibility to the material, such for example that it may be bent or formed into the shape of a basket. This basket may be connected to the sheet metal cover preferably at spaced marginal points that minimize heat conduction between the basket and cover; such connections being made for example by welding with or without a welding rod. Because of the open structure of the expanded metal it reduces the transfer of heat from the heated equipment to which it is applied for insulating purposes. Also the slight flexibility of the expanded metal permits slight distortion of the panel to compensate for uneven or gently curved surfaces of the structure to be insulated, thus permitting flat panels to be used on round, as well as square structures of substantial size.

The sheet metal cover, which constitutes the outer face of the panel, provides sufficient rigidity and strength to make the panel a self-sustaining unit and provides a protective cover for the inner face and contents of the panel against adverse weather conditions. The sheet metal cover also makes possible a sturdy and reliable form of connection by overlapping, interlocking, or other arrangement between adjacent panels when placed edge to edge to form a wall-like structure or cover for the equipment to be insulated. The sheet metal cover may be made of any suitable metal and may if desired be painted to prevent corrosion and to increase reflection of solar heat.

Between the opposite faces of the panel, that is, between the expanded-metal or other reticulated metal backing and the sheet metal cover there may be arranged any desired form of heat insulating material, either light or heavy and either of the mass non-reflective type or the sheet type with heat reflective surfaces. If the expanded-metal is formed into a basket the material may be arranged loosely or packed within the basket and the expanded-metal walls of the basket will prevent any undesired compression of the insulating material particularly so where the insulation is of fragile form. Where heat reflective sheet material is used, such as metal foil, the sheets may be separated to provide heat insulating dead-air spaces between adjacent sheets. This may be obtained to a substantial extent by crumpling of the sheets so as to prevent flat surface contact between sheets; also separators of suitable form may be used for separating the sheets. Illustrative examples of suitable heat insulating materials are, aluminum foil, paper or fabric sheets with heat reflective surfaces, glass wool, rock wool, mineral wool, lead wool, air cell asbestos, balsam wool, granulated cork, kapok, hair-felt, fiber board, cork board, magnesia blocks.

The above types of materials may be used individually or in various combinations for insulating the panel faces from each other. When a mass type of insulation is used, such as for example, glass wool, it is of advantage although not essential, to use in addition one or more sheets of foil or sheet material having heat reflective properties, which are missing in the mass insulation. For example, a sheet of aluminum foil may be used to cover or partially cover the mass insulation. The foil sheet would normally be placed between the insulation and the expanded-metal backing or basket. If desired the expanded metal basket might be completely lined with the metal foil and thereby form a substantially air-impervious member between the expanded metal walls and the insulation enclosed within the basket which in this case might be either sheets of foil or mass insulation. This inner foil liner would prevent flow of air into or out of the panel and thereby augment the heat insulating effect of dead-air spaces within the panel. Also, this foil liner would prevent liquids, which might accidentally escape from the insulated tank, from entering the panel and damaging the insulating material therein.

If a substantially solid or compressed type of insulation is used, it may function wholly or partially as the spacing means between the opposite faces of the panels and in such case no metal side walls would be required for the panel. Suitable forms of insulation for this purpose are, for example, preformed, compressed bats of glass or mineral wool or slabs of compressed cork or fiber.

When using the panels of my invention for insulating horizontal or vertical tanks or the like, I provide for overlapping the panels on at least one edge and for joining certain of the abutting edges of adjacent panels so that a complete self-supporting wall or cover for the structure to be insulated may be provided without the necessity of tying or any other positive physical fastening of the insulating units to the insulated structure and without any additional encircling or other supporting means. The expanded metal backing member or basket may be placed in close contact with the wall which it insulates. If pipes or similar small circular structures with a sharp curvature are to be covered, a curved or rounded form of panel will be used.

A feature of my invention in connection with the installation and dismantling of the panel units is the provision of a demountable clincher device that permits removing any one or more of the panel units from an insulating wall structure without disturbing the other units. This type of connection also facilitates rapid and easy assembly of the panel units into a complete insulating wall.

My invention will be more fully understood from the following detailed description taken in conjunction with the accompanying drawings in which Fig. 1 is a perspective view of one form of my panel;

Fig. 3 is a sectional view taken along lines 3—3 of Fig. 2 showing different forms of insulating material;

Fig. 4 is a sectional view taken along lines 4—4 of Fig. 2 showing a modified form of overlapping connection;

Fig. 5 is a sectional view taken along lines 5—5 of Fig. 2 showing a demountable connector;

Fig. 6 is a top plan view of a portion of my panel showing flexing of the panel to conform to a curved surface;

Fig. 7 is a fragmentary sectional view showing another form of connection assembly for adjacent panels before the connection is completed; and Fig. 8 is a sectional view showing the completed connection.

Figure 1:
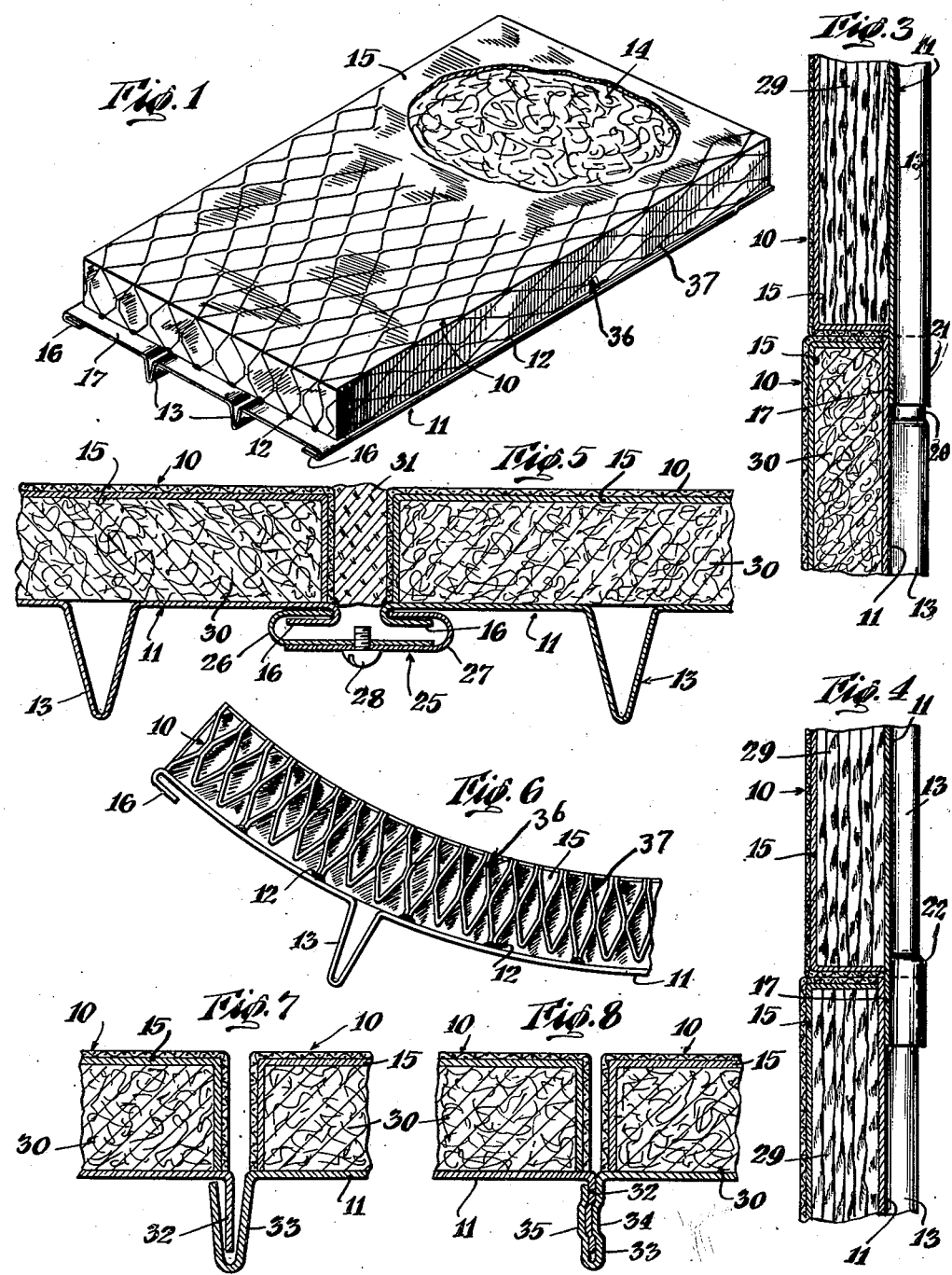

Referring now more in detail to the several figures of the drawings, it will be seen that the metal panel in the form shown therein, comprises a reticulated or expanded metal basket 10, the top of which is covered by a sheet metal jacket 11, the latter being attached to the metal basket by means of spaced spot-welds 12. These welds are provided at different points around the periphery of the top edge of the expanded metal basket. By means of these spot welds the sheet metal cover 11 is welded to the peripheral edges of the wires in the side walls of the reticulated metal basket 10. This type of small surface contact connection between the metal basket and sheet metal jacket avoids any appreciable through-metal contact between these two members. The side walls 36, which in this specific but non-limiting embodiment constitute the connecting means between the reticulated face and solid metal face of the panel, comprise spaced flexible metal wire connectors 37. These and functional equivalent forms of spaced metal connectors are characterized by being made of thin, relatively flexible metal and are accordingly of relatively low heat conducting capacity. They minimize heat conduction and permit flexing of the panel as described above.

The outer sheet metal jacket or cover 11 is provided with folded portions of excess metal in the form of inverted V-shaped ribs 13. These ribs provide greater strength for the panel and prevent denting or buckling of the sheet metal cover 11. These ribs of excess material also allow for expansion of the sheet metal cover with increase in temperature of the metal caused by solar heat or heat from the hot oil tank or similar structure to which the panel is applied.

Inside of the expanded metal basket 10 and between it and the sheet metal cover 11 is placed insulating material such as glass wool illustrated at 14. This wool is arranged to fill or substantially fill the basket 10 and may, if desired, be preformed as a bat of suitable size to fit within the basket 10. Depending upon the thickness of the bat, one or more bats may be required to fill the basket.

Covering the glass wool 14 and located between it and the walls of the reticulated metal basket 10 is a sheet of heat reflective aluminum foil 15. This foil serves to reflect the majority of the radiant heat back against the surface on which the insulation is applied resulting in quick preheating or quick cooling of the insulated surface as desired. This foil will be protected from compressive forces by the expanded metal basket 10 which is of self-sustaining strength, although the openings or interstices may occupy a substantially larger area than the expanded metal itself, and thereby provide ample opportunity for reflection of heat by the inner aluminum foil lining 15. As above suggested, this lining 15 may be omitted if desired.

The expanded metal basket 10 and the outer sheet metal cover 11 are preferably painted with aluminum paint applied in such a manner that it will withstand high temperatures without disintegration or discoloration. Such aluminum coated surfaces will act not only as reflectors of radiant heat on the inside of the panel toward the surface being insulated, but they also insure a very low emission of radiant heat on the outside surface of the tank. In summer daylight operation the outside aluminum painted surfaces will serve to reflect a major portion of the incident solar radiant heat.

The long side edges of the sheet metal cover 11 are folded back a suitable distance for example, one-half of an inch to form a clincher edge shown at 16. This clincher edge extends along each side of the panel cover 11. One end edge, usually the bottom edge, of each panel is extended so that it forms an overhanging jacket or skirt shown at 17. This jacket extends a suitable distance, for example, about 1½ inches beyond the edge of the expanded metal basket 10. The opposite edge, usually the top edge, and sides of the cover 11 are substantially flush with the adjacent edges of the basket 10, that is, no flanges or extensions are required along these edges. The purpose of the flange or extension at the bottom edge of the panel is to provide for an overlapping of the panels when arranged vertically as illustrated in Fig. 2.

Figure 2:
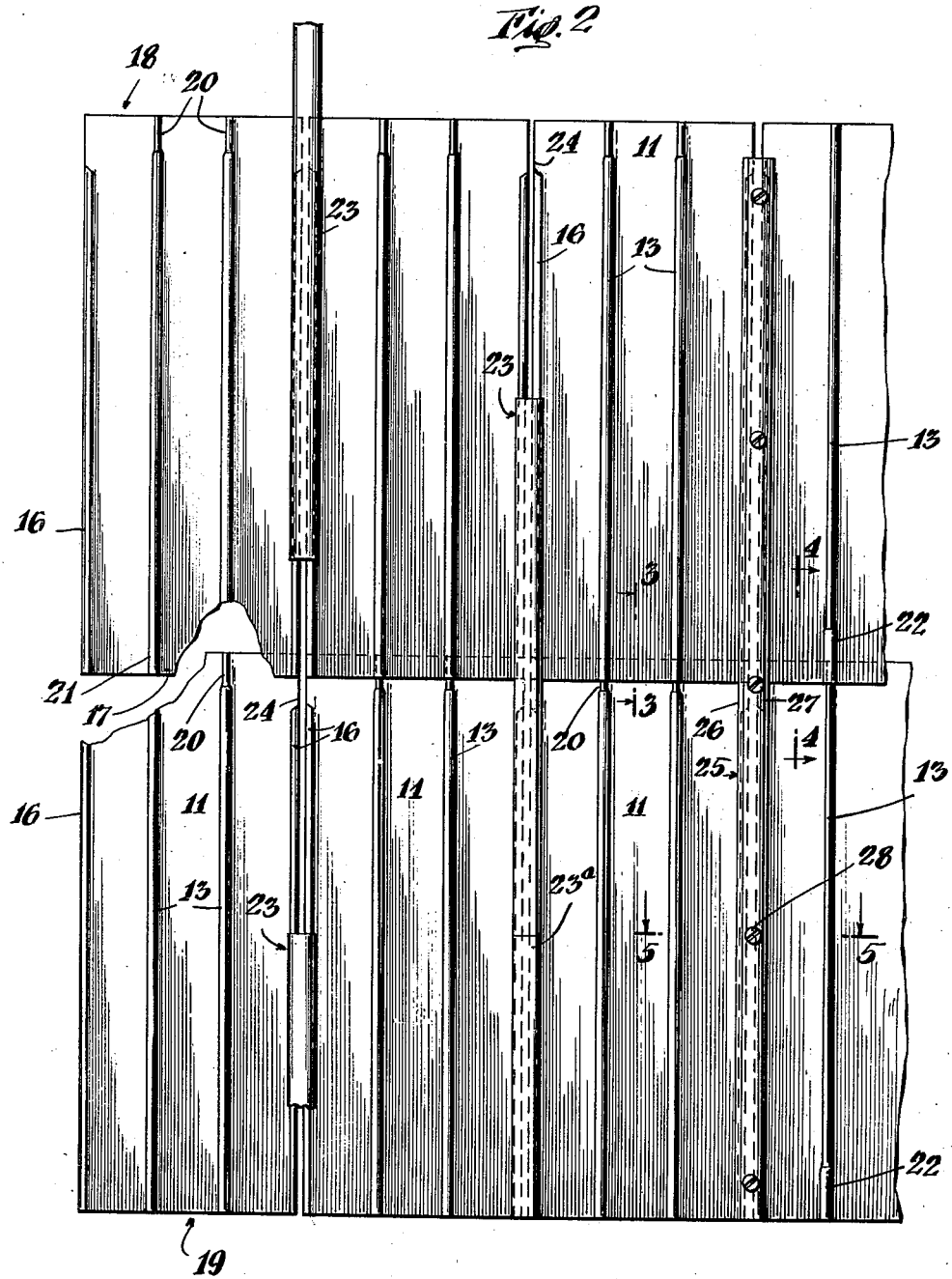
Fig. 2 is a front view of several of my panels joined together.

As shown in Fig. 2, and as illustrated more in detail in Figs. 3 and 4, the top panels indicated generally at 18 overlap the set of lower positioned panels 19 by means of the jacket extensions 17 described above. To provide for overlapping of the corresponding reinforcing ribs 13 of the upper and lower panels, a portion of the ribs 13, as shown at 20, may be slightly compressed or squeezed together so that the overlapping end portions 21 of the upper panel will fit thereover.

An alternative overlapping arrangement of the ribs 13 is indicated at the right side of Fig. 2. In this arrangement an end portion 22 of the rib 13 on the upper panel is expanded or dilated sufficiently to fit over the adjacent portion of the rib 13 on the lower panel, which in this case does not have to be compressed. With this type of overlapping connection between upper and lower panels as shown more particularly in Figs. 3 and 4, the basket portion of the upper panel rests upon the adjacent basket of the lower panel, and in this way any desired number of vertical units of the panel may be arranged to cover the entire wall surface of the vertical tank or other equipment to be insulated, and the panels are self-supporting.

To join the assembled panels together so that no physical attachment of the panels to the insulated structure is required, there is provided a clincher strip 23 which is shaped to engage the bent side edges 16 of adjacent panels. This strip may be driven down over the panel edges to join with another similar strip 23a as indicated at the center of the Fig. 2. This connecting strip 23 will extend across the junction of the lower panels and the upper panels so as to hold the assembly of panels together. The bent side edges 16 of the panels may be cut away for a short distance at the ends of each panel as indicated at 24 so that the clincher strip 23 may be inserted at these points or removed at these points, thereby making it easy to assemble or dismantle any desired number of the panels without disturbing the other panels in the insulation system.

A convenient form of clincher strip for connecting abutting panels is shown at 25 in Figs. 2 and 5. As illustrated, this clincher strip is made in two parts, 26 and 27, which are joined together by means of a removable machine screw 28. It is sometimes desirable to remove one clincher strip without disturbing the next clincher strip in line, and this two-piece form of clincher strip will serve this purpose since it may be dismantled easily and quickly by removing the screws 28.

Referring now more particularly to Figs. 3 and 4 which show the two overlapping arrangements for vertical panels, described above in connection with Fig. 2, there is illustrated in the top panel of Fig. 3 and in both panels in Fig. 4 an aluminum foil type of insulation. In this embodiment the insulation comprises a plurality of crumpled sheets of aluminum foil indicated generally at 29. These sheets of foil are highly heat reflective and have negligible heat conductive capacity. They are substantially coextensive with the expanded metal basket in length and width, and may if desired be fastened at each end of the basket by any suitable means. If the above described cover sheet of aluminum foil is also used for preventing flow of air into and out of the basket the crumpled metal foil sheets 29 may be connected to this foil cover sheet by means of a suitable adhesive, or other means.

By virtue of the crumpling of these foil sheets, and augmented by fixed connections of these sheets at their ends if desired, there is provided between the adjacent sheets, appreciable dead air spaces that have a decided heat insulating effect. In a preferred arrangement the crumpled foil sheets are arranged so that an air space of about ⅜ of an inch will be provided between adjacent sheets. The crumpling of the foil sheets provides surfaces of various heights and formations so that when the sheets are laid side by side in the metal basket any contact between adjacent sheets will be only point contact instead of continuous flat surface contact. This arrangement insures a minimum amount of heat transfer between adjacent sheets. This spaced arrangement of crumpled sheets is indicated in Figs. 3 and 4 of the drawings.

The insulation material 30 shown in the lower panel in Fig. 3 may be of the glass wool form of insulation or any other of the suitable mass type of insulations enumerated hereinabove. As indicated in Fig. 3 the insulation material in adjacent panels may be of the crumpled aluminum foil type 29 and of the mass type of insulation 30, respectively; or as indicated in Fig. 4 the adjacent panels may both employ the same crumpled foil insulation 29. Various other combinations and modifications may be used if desired.

As illustrated in Fig. 5, which shows the details of the reinforcing expansion joints 13 and of the demountable clincher strip 25, the laterally adjacent panels may have a space between their side edges filled with gasket material, as indicated at 31. These gaskets may be made of any suitable material, such for example as hair felt, glass wool, mineral wool, rock wool, matted asbestos, etc. The expanded metal basket 10 because of its irregular formation will securely maintain the gasket 31 in position and at the same time permit any necessary expansion of the gasket into the panel, that is, through the interstices of the basket, without materially increasing its density and thereby maintaining its original insulating effect. This form of gasket insulated connection between adjacent panels although not essential, provides a flexible or expansible type of joint such that the adjacent panels are free to move within a limited extent upon contraction and expansion of the metal with changes in temperature. When a substantially solid or compressed type of insulation material is used such as preformed bats of glass wool and the side walls of the reticulated metal basket omitted, as described above, the bats may be made oversized so that they will project a short distance beyond the sides of the panel and thereby serve as a gasket. This arrangement provides self gasketing and avoids any necessity for extra separate gaskets such as 31 in Fig. 5. The clincher strip 25 is so proportioned in size as to permit variations due to expansion and contraction and to correspond to different size separations between adjacent panels.

Where appreciable change in dimension is not contemplated, the adjacent panels may be brought together in substantially abutting relationship without the use of the gasket 31 and in this case the clincher strip 25 will be made to form a tight fit over the adjacent bent panel edges 16. Even in such a case, however, the reinforcing expansion joints 13 will permit any necessary slight change in dimension.

The form of semi-flexible connection between the expanded metal basket 10 and the sheet metal cover 11 described above, is illustrated more clearly on an enlarged scale in Fig. 6. As shown in this figure, the basket is spot welded at spaced points to the sheet metal cover 11, but is not otherwise connected to this cover. By means of these spaced point-like connections the basket is free to distort to an appreciable extent and thereby compensate for irregular surfaces to which it is applied or to fit a curved surface of large diameter and having a general curvature. Also these point-like connections reduce to a minimum extent the direct metal contact between the basket and sheet metal cover and thereby minimize as much as possible the direct conduction of heat between the basket and cover.

There is shown in Figs. 7 and 8 a different form or arrangement for joining adjacent panels together. In this arrangement no clincher strip, such as 25 shown in Fig. 5, is needed. In the modification shown in these two figures the edge of the sheet metal cover 11 of one panel is bent at a substantially right angle so as to form an upright projection 32. Now the corresponding edge of the sheet metal cover for the adjacent panel is bent into a substantially U-form as indicated at 33 so that it will fit over the upright piece 32 of the other panel. To complete this form of connection, that is, to tie the two bent edges of adjacent panels together so that they will not slip apart, the members 32 and 33 are subjected to a button-punching operation as indicated in Fig. 8. By means of this operation a depression is made in the member 33 as indicated at 34 in Fig. 8. A part of the depressed metal is caused to flow and combine with a similarly depressed portion of the member 32 as indicated at 35. This forms what is commonly known as a button-punch type of connection. The slight space indicated at 36 between adjacent panels connected in this manner may or may not be filled with an insulating gasket as desired.

It is to be understood that various modifications and changes may be made in the materials, construction and method of application described above in connection with the various figures without departing from the scope of my invention, some of the novel features of which are defined in the appended claims.

I claim:

1. A heat insulating metal panel, adapted for use as an easily replaceable unit of a heat insulating assembly for high temperature industrial equipment, comprising a backing member formed from reticulated metal of substantially the strength of expanded metal, said backing member constituting one reticulated face of the panel, a sheet metal cover constituting the other closed face of the panel and spaced metal members connecting said reticulated backing member and said sheet metal cover at marginal points, said panel faces being connected in spaced relationship so as to provide therebetween a space for insulating material, heat insulating material located within said space and confined by said reticulated backing member and said sheet metal cover, said reticulated member having sufficient strength to protect the insulating material and prevent it from being deleteriously compressed between said sheet metal cover and the insulated structure, the inherent slight flexibility of said reticulated backing member in combination with said spaced metal connectors between this backing member and the sheet metal cover giving the panel sufficient flexibility and compressibility to allow slight deformation of the panel to compensate for surface irregularities and to conform generally to the gentle curvature of the object to be insulated.

2. A heat insulating metal panel adapted for use as an easily replaceable unit of a heat insulating cover for high temperature industrial equipment and adapted to be flexed slightly to conform generally to the curvature of the object to be insulated by a plurality of such panels, comprising a metal basket-like member made of reticulated metal of substantially the strength of expanded metal and having one normally open face and substantially straight vertical side walls, heat insulating material located within said basket-like member to inhibit transfer of heat between opposite faces of the panel and a metal cover located over said normally open face to enclose said insulating material within said basket-like member and to protect said material from the weather and other injurious effects, said cover being connected at spaced points to the normally open, peripheral point-like surfaces of the vertical side walls of said reticulated member, said discontinuous point-like connections preventing substantial through-metal contact between said side wall edges and said cover, said reticulated metal side walls being sufficiently strong to serve as the separating means between said metal cover and the opposite face of said basket member and prevent compression of said insulating material therebetween, but being sufficiently flexible to permit curving of said basket-like member to conform to a curved object of relatively large surface area as compared to the contacting surface area of said panel.

3. A heat insulating metal panel comprising a reticulated substantially rectangular pan-shaped metal member having one normally open side, a lining of heat reflective air impervious, sheet material located within said pan-shaped member adjacent the walls thereof that reflects radiant heat and substantially prevents flow of air into and out of said pan-shaped member, heat insulating material located within said lined pan-shaped member, and a sheet metal cover located over said normally open side of said pan-shaped member and welded thereto at peripheral points along the edges of said normally open side.

4. A heat insulating metal panel comprising an outer sheet metal cover, a substantially rigid reticulated metal basket having one normally open side and being attached to said metal cover at peripheral points along the edges of said normally open side, thereby preventing substantial heat conduction through metal contact between said basket and metal cover, a metallic foil basket shaped member located within said basket and forming an air impervious heat reflective lining for said reticulated basket and providing an effective heat insulating dead air space within said basket such that flow of air into and out of said basket is substantially prevented, and heat insulating material loosely arranged within said metal foil basket-shaped member so as to divide said dead air space into a plurality of smaller dead air spaces which substantially prevent transfer of heat through said basket.

5. A heat insulating metal panel as defined in claim 4 in which the basket-shaped metal foil member is made of aluminum foil.

6. A heat insulating panel as defined in claim 4 in which the insulating material located within the metal foil basket-shaped member is made of sheets of crumpled aluminum foil arranged in superimposed spaced relationship providing effective heat insulating dead air spaces between adjacent foil sheets.

7. A heat insulating metal panel as defined in claim 4 in which the insulating material is in the form of crumpled metal foil sheets that are attached at their ends to the metal foil basket-shaped member.

8. A heat insulating metal panel comprising an expanded metal basket, a heat reflective lining covering substantially the entire inner surfaces of said basket and providing an effective heat insulating dead-air space within said basket so that flow of hot air out of said basket and cold air into said basket is substantially eliminated, a plurality of sheets of heat reflective crumpled foil arranged within said basket in spaced relationship with each other and in fixed relationship with said basket and dividing said dead-air space into individual dead-air spaces between adjacent sheets, and a metal cover attached to said basket only at points around the periphery of the open side of said basket to effect minimum heat transfer between said basket and metal cover.

9. A heat insulating panel comprising a solid metal cover having a fold of excess metal to permit expansion, a backing metal member and heat insulating material located between said cover and said backing member, and flexible spaced, metal, side-wall members joining said backing member and cover along a discontinuous connecting edge, said flexible connecting members and said excess metal in said cover permitting flexing of the panel to conform to gently curved surfaces.

10. A heat insulating panel comprising a solid metal cover having a rib of excess metal to permit expansion of said cover, a backing metal member having reticulated side walls connecting to said metal cover, heat insulation material located between said backing member and said cover, said reticulated side walls having interstices that extend to the surface of said metal cover so that a discontinuous connection is made between said reticulated side walls and said metal cover such that distortion of said reticulated side walls may take place upon flexing of the panel to conform to a generally curved surface and said rib in said metal cover permitting an expansion thereof upon flexing of the panel.

11. A heat insulating panel adapted to expand and contract with varying temperature conditions such as encountered in insulating high temperature industrial equipment comprising a metal cover having a fold of excess metal adapted to expand and contract with varying temperature conditions, heat insulating material adjacent said metal cover, a backing member for said insulation material and inherently flexible spaced, side-wall metal members connecting said backing member and said metal cover at spaced points so that said backing member may expand and contract with said metal cover with changes in temperature.

12. A heat insulating panel comprising a solid metal cover having a fold of excess metal to permit the cover to be expanded or contracted mechanically, a flexible reticulated backing metal member having substantially the strength of expanded metal, heat insulating material located between said cover and said backing member and spaced thin metal members of relatively low heat conducting capacity connected with said flexible backing member and attached to the inside surface of the cover plate at spaced intervals to form a flexible connection between said cover and said backing member, said thin metal connecting members in combination with said reticulated flexible backing member minimizing heat conduction therebetween and permitting flexing of the panel to conform to gently curved surfaces and permitting the independent thermal expansion and contraction of said metal cover and said backing member.

13. An insulating jacket comprising a plurality of panels as specified in claim 12 arranged in juxtaposed relationship so that the said covers and the heat insulating material form an approximately continuous body but said backing members are supported and held independent of each other so that said backing members can expand independently of expansion of said cover members.

14. A heat insulating panel comprising a backing member formed from reticulated metal of substantially the strength of expanded metal, said backing member constituting one reticulated face of the panel, a solid metal cover arranged in spaced relationship with said backing member and constituting the other closed face of the panel, a mass of substantially non-reflective heat insulating material located between said spaced panel faces and a liner sheet of heat reflective insulating material located between said mass insulation and said reticulated backing member, and metal connectors connecting said panel faces at spaced intervals so as to form a flexible connection between said faces and thereby permit flexing of the panel to conform generally to the gentle curvature of an object to be insulated.

15. A heat insulating panel as defined in claim 14 in which the liner sheet of heat reflective material is a sheet of aluminum foil.

ROY J. SCOTT.